(12) United States Patent
Ghabra et al.

(10) Patent No.: US 7,629,873 B2
(45) Date of Patent: Dec. 8, 2009

(54) METHOD AND APPARATUS FOR CONFIGURING PASSIVE ENTRY SYSTEM OPERATION MODES

(75) Inventors: Riad Ghabra, Dearborn Heights, MI (US); Carl L. Gilbert, Southfield, MI (US); Shubha Channappa, South Lyon, MI (US)

(73) Assignee: Lear Corporation, Southfield, MI (US)

( * ) Notice: Subject to any disclaimer, the term of this patent is extended or adjusted under 35 U.S.C. 154(b) by 883 days.

(21) Appl. No.: 11/127,398

(22) Filed: May 12, 2005

(65) Prior Publication Data

US 2006/0255906 A1 Nov. 16, 2006

(51) Int. Cl.
*G05B 19/00* (2006.01)
(52) U.S. Cl. .................. 340/5.25; 340/5.61; 340/426.14
(58) Field of Classification Search ................ 340/5.25, 340/5.24, 5.22, 5.72, 426, 5.1, 825.22, 426.13
See application file for complete search history.

(56) References Cited

U.S. PATENT DOCUMENTS

| | | | | |
|---|---|---|---|---|
| 6,628,196 | B1 * | 9/2003 | Flick | 340/426.13 |
| 2001/0054952 | A1 * | 12/2001 | Desai et al. | 340/5.72 |
| 2004/0150512 | A1 * | 8/2004 | Yoshikawa | 340/426.13 |
| 2005/0242923 | A1 | 11/2005 | Pearson et al. | |
| 2005/0258934 | A1 | 11/2005 | Buck et al. | |
| 2005/0275511 | A1 | 12/2005 | Luo et al. | |

FOREIGN PATENT DOCUMENTS

| | | |
|---|---|---|
| DE | 10156638 | 9/2003 |
| DE | 10346943 | 5/2005 |
| GB | 2419718 | 5/2005 |
| GB | 2415534 | 12/2005 |

* cited by examiner

*Primary Examiner*—Brian A Zimmerman
*Assistant Examiner*—Nabil H Syed
(74) *Attorney, Agent, or Firm*—MacMillan, Sobanski & Todd, LLC

(57) ABSTRACT

A method is provided for configuring an operation mode of a passive entry system of a vehicle. A configuration mode of a vehicle based communication module is enabled by depressing a predetermined combination of actuation buttons on a portable communication device to broadcast a configuration mode command signal. A passive entry configuration is selected by depressing a respective actuation button on the portable communication device when in the configuration mode. The portable communication device broadcasts a corresponding command signal to the vehicle based communication module identifying the selection. The corresponding command signal is received from the portable communication device and the selected passive entry configuration is adopted in response thereto.

19 Claims, 3 Drawing Sheets

METHOD AND APPARATUS FOR CONFIGURING PASSIVE ENTRY SYSTEM OPERATION MODES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to remote entry convenience systems, and more specifically, to configurable vehicular passive entry systems.

2. Description of the Related Art

Passive entry systems as well as remote keyless entry systems are well known in the art. Remote keyless entry systems utilize a portable communication device which includes a wireless transmitter for use by a vehicle user that transmits a wireless signal, typically radio frequency (RF), to a receiver disposed within a vehicle based communication module within the vehicle for activating a remote keyless entry function.

Passive entry systems include a remote transceiver typically disposed within the portable communication device (fob) that transmits a RF response signal to the vehicle for activating a vehicle entry function (e.g., unlocking a door lock) in response to receiving a challenge signal from the vehicle. Challenge signals may be broadcast at timed intervals (polling) or may be broadcast in response to a triggering event (non-polling) such as the sensing the actuation of a vehicle entry component (e.g., sensing the lifting of a door handle). Passive entry systems are devised for a user's convenience so that the user does not have to actively actuate a designated pushbutton on the portable communication device or some other device for activating the respective vehicle entry device.

A drawback to passive entry systems is that it may be undesirable in certain circumstance to have the passive entry system active, such as when contents within a vehicle are being unloaded from the interior of the vehicle. For a passive entry system that includes auto-door unlocking (i.e., unlocks the vehicle door as you approach the vehicle) and auto-door locking (i.e., locks the vehicle door as you move away from the vehicle), the system may continuously transition between door lock and door unlock when the user transitions to and from the vehicle for retrieving the vehicle contents.

An additional switch may be added to the vehicle for allowing the user to deactivate the passive entry operation mode of the portable communication device. However, adding additional switches to the vehicle adds additional cost.

SUMMARY OF THE INVENTION

The present invention has the advantage of allowing a user to configure respective vehicular passive entry operation modes for disabling and enabling a respective vehicular passive entry function by utilizing existing buttons on a portable communication device to configure the operation modes. The present invention also allows the user to disable and enable the passive entry functions of a vehicle.

In one aspect of the present invention, a method is provided for configuring an operation mode of a passive entry system of a vehicle. A configuration mode of a vehicle based communication module is enabled by depressing a predetermined combination of actuation buttons on a portable communication device to broadcast a configuration mode command signal. A passive entry configuration is selected by depressing a respective actuation button on the portable communication device when in the configuration mode. The portable communication device broadcasts a corresponding command signal to the vehicle based communication module identifying the selection. The corresponding command signal is received from the portable communication device and the selected passive entry configuration is adopted in response thereto.

DETAILED DESCRIPTION OF PREFERRED EMBODIMENTS

Figure 1:
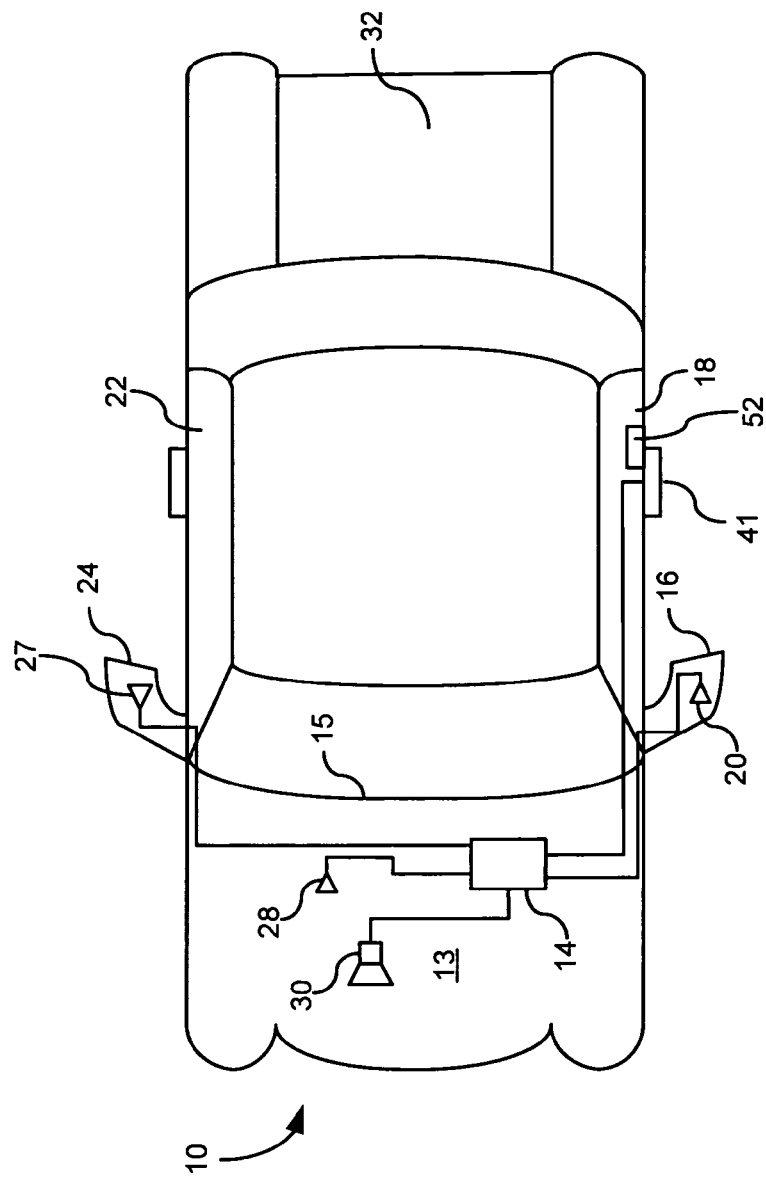
FIG. 1 is a system diagram of a vehicular integrated remote keyless-passive entry system according to a preferred embodiment of the present invention.
Figure 1:
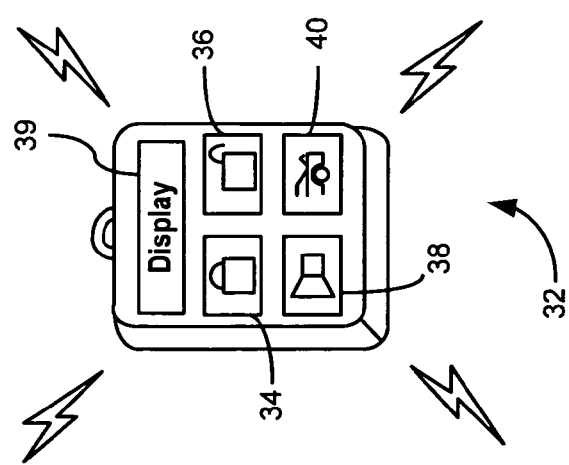

Referring to FIG. 1, a vehicle 10 is shown including a vehicle based communication module 14 mounted on said vehicle 10 such as in an engine compartment 13 or within a vehicle instrument panel 15. The vehicle based communication module 14 is coupled to a first exterior antenna 20, which may be mounted in an exterior structure of the vehicle 10 such as a driver's sideview mirror housing 16, a vehicle door 18, or the engine compartment 13. Additional transmitters or antennas may be mounted to the vehicle 10 at various passive entry zone locations remote from the vehicle based communication module 14, if desired, such as a passenger's side view mirror 24. The vehicle door 22 provides a secure entry barrier between an interior region and an exterior region of the vehicle 10.

Apart from a conventional mechanical key locking mechanism for unlocking a vehicle door, a passive entry system and/or a remote keyless entry system may be used to unlock the vehicle door 18 for gaining access to the interior region of the vehicle 10. A remote keyless entry system includes a portable communication device 32 having a plurality of actuation buttons disposed on a face of the portable communication device 32. The portable communication device 32 such as a remote keyless entry (RKE) fob broadcasts RF signals to the vehicle base communication module 14 located within the vehicle 10 for actuating vehicle entry functions such as unlocking and locking a vehicle door 18, unlatching a trunk latch 32, and for activating and deactivating a vehicle alarm system 30. The plurality of actuation buttons include a vehicle lock switch 34, a vehicle unlock switch 36, an alarm switch 38, and a trunk unlatch switch 40. The portable communication device 32 typically broadcasts the RF signals at a maximum power level that is regulated by the FCC. Based on the sensitivity of a receiver in the vehicle based communication module 14, an RF signal broadcast by the portable communication device 32 is received when the vehicle 10 (i.e., vehicle based communication module 14) is within the broadcasting range of the portable communication device 32. The vehicle based communication module 14 determines the validity of the RF signal broadcast by the portable communication device 32 for actuating a selected vehicle entry function.

The passive entry system allows a user to unlock a vehicle without an actuation of a pushbutton on the portable communication device 32 or other portable device. The passive entry system may be a polling or non-polling system. In a polling passive entry system, the vehicle based communication module 14 broadcasts a challenge signal at timed intervals for determining the presence of an authorized portable communication device 32 when the vehicle doors are locked and the passive entry system is active. The portable communication device 32 broadcasts a response RF signal to a vehicle based communication module 14 for remotely actuating a respective vehicle entry function such as unlocking or locking the vehicle door 18, unlatching a trunk 32, or for activating or deactivating a vehicle alarm system 30. Alternatively, a wake signal may be used in a polling system for waking the portable communication device prior to broadcasting the challenge signal. In a non-polling passive entry system, the vehicle based communication module 14 waits for a triggering event, such as the actuation of a vehicle door handle 41, before broadcasting the challenge signal to the portable communication device 32.

Figure 2:
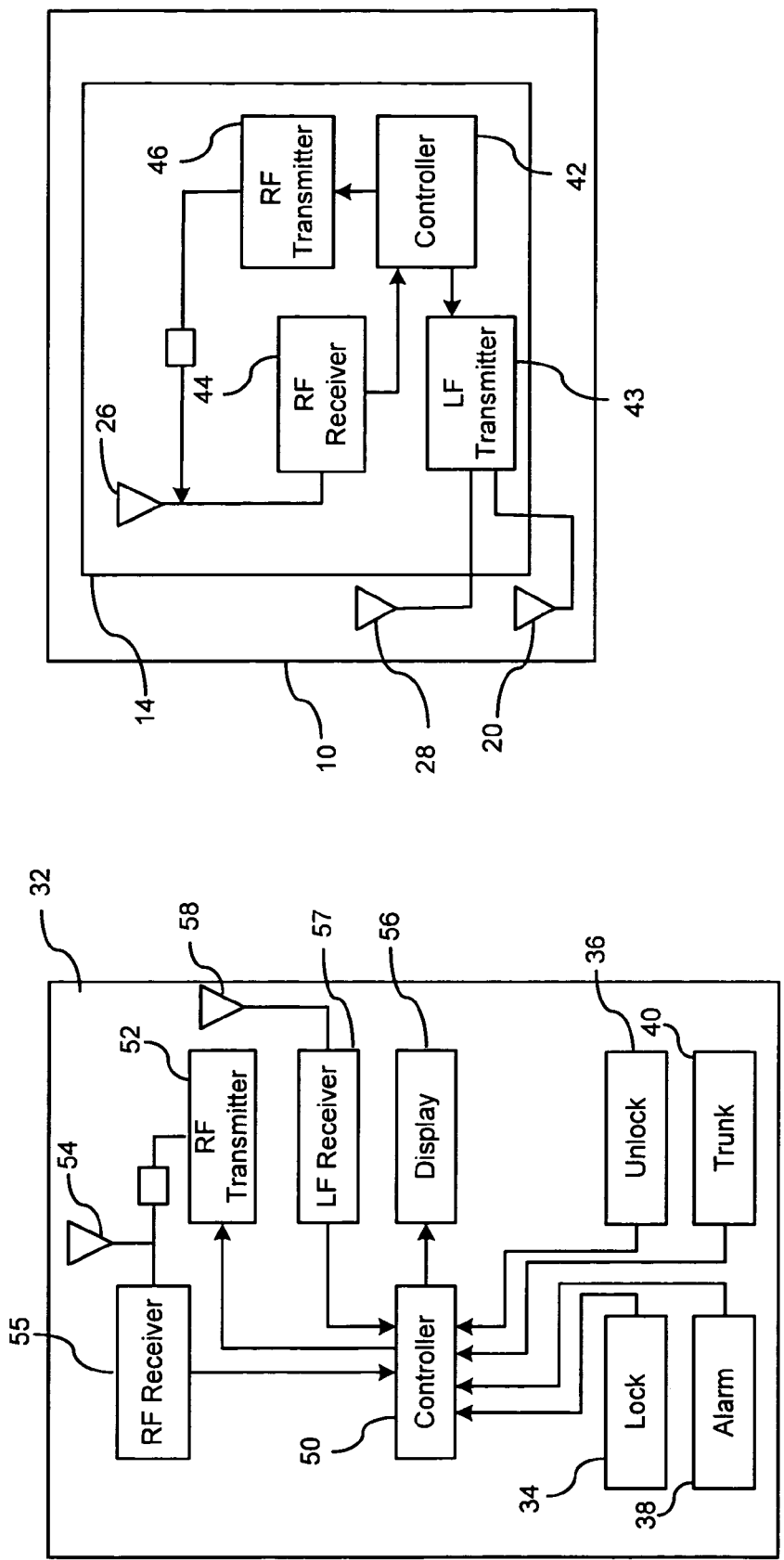
FIG. 2 is a schematic block diagram of the remote keyless-passive entry system according to a preferred embodiment of the present invention.

FIG. 2 illustrates a schematic block diagram of a preferred embodiment of the integrated two-way RKE and passive entry system. The vehicle based communication module 14 includes a microcontroller 42 coupled to a LF transmitter 44, a RF receiver 44, and a RF transmitter 46. In certain embodiments of the present invention, additional LF transmitters or LF antennas may be provided. The additional transmitters or antennas may be located in the vehicle remotely from vehicle based communication module 14 at various entry zones being monitored by a passive entry system, such as an antenna 20 in the driver's sideview mirror 16, an antenna 27 in the passenger's sideview mirror 24, or an antenna 28 in the engine compartment 13, for example.

A RF antenna 26 is coupled to a RF receiver 46 as well as to a RF transmitter 48 through a matching circuit 54. For a passive entry system, the LF transmitter 43 is used to transmit a low frequency signal around the vehicle for waking a portable communication device in the vicinity of the vehicle 10. A challenge signal is thereafter broadcast by the RF transmitter 46 of the vehicle based communication module 14 for requesting a response signal from the portable communication device 30.

The portable communication device 32 includes a LF receiver 57 coupled to the microcontroller 50 and to a LF antenna 58 for detecting a wakeup signal broadcast from vehicle based communication device 14. The portable communication device 32 also includes a RF receiver 55 for receiving the broadcast challenge signal from the vehicle based communication module 14. The microcontroller 50 is coupled to a RF transmitter 52 and antenna 54 for broadcasting a response signal to the vehicle based communication module 14 in response to the challenge signal. The vehicle based communication module 14 after receiving the response signal determines the authenticity of the portable communication device 32 and activates a respective passive entry vehicle function in response thereto.

As discussed earlier, in certain situations, it may be desirable for a user to deactivate a passive entry vehicle feature such as disabling the passive door unlock feature, for example. The present invention allows the user to disable a specific passive entry feature when configured. To configure an operation mode of the passive entry system, a predetermined combination of buttons is depressed on the portable communication device 32. The predetermined combination may include depressing two or more buttons simultaneously, or depressing a combination of buttons in a specific order, or depressing buttons simultaneously and in a specific order. For example, the lock button 34 and unlock button 36 are depressed simultaneously. The simultaneous depression of both buttons signals the microcontroller 50 to broadcast a configuration mode command signal via the RF transmitter 52 and antenna 54 to the vehicle based communication module 14. The configuration mode command signal is received by the antenna 26 and RF receiver 44 of the vehicle based communication module 14 and is provided to the controller 42. The controller 42, upon receiving a configuration mode command signal and authenticating the portable communication device 32, enters a configuration mode for configuring the passive entry system.

After the configuration mode is entered, the user depresses a respective button associated with the passive entry function that is intended for configuration. The portable communication device 32 broadcasts a corresponding command signal to the vehicle based communication module 14 identifying the selection. The microcontroller 42 of the vehicle based communication module 14 upon receiving the corresponding command signal determines the current operating mode of the selected passive entry function and switches the operating mode to the alternative. For example, if the polling passive entry unlock feature is currently enabled (i.e., vehicle door doors unlock automatically as the passive entry system detects an authorized portable communication device is within range of the vehicle) when the corresponding command signal is received, then the controller 42 disables the polling passive entry unlock feature. Similarly, if the controller 42 determines that the polling passive entry unlock feature is disabled when the corresponding command signal is received, then the controller 42 enables the polling passive entry unlock feature.

With respect to a polling passive entry auto-lock mode, if the lock button 34 is depressed (when in the configuration mode) and the controller 42 determines that the polling auto-lock passive entry mode is currently enabled, then the controller 42 disables the polling auto-lock passive entry mode. Alternatively, if the polling auto-lock passive entry mode is disabled while in configuration mode when the lock button 34 is actuated, then the controller 42 will enable the polling auto-lock passive entry mode. For a passive entry system utilizing non-polling operations, the passive entry features are enabled and disabled in the same manner.

All passive entry system functions may be deactivated in a similar manner to that described above. A designated button (or combination of buttons) may be actuated when in the configuration mode. The designated button is associated with a command signal to deactivate the passive entry system if the passive entry system is currently enabled, or alternatively, to activate passive entry system if the passive entry system is currently disabled.

To disable (deactivate) a respective passive entry operating function (or functions), the microcontroller 42 of the vehicle based communication module 14 ceases to broadcast the wakeup and challenge signal to the personal communication device for a respective passive entry function. For example, if the auto-unlock passive entry function is disabled, a vehicle based communication module will not broadcast the wakeup and challenge signals during those periods when the passive entry system is active and the doors are locked. However, the microcontroller 42 will continue to broadcast challenge signals for the passive entry auto-lock function (i.e., when the passive entry system is active and the vehicle doors are locked) or any other passive entry function that remains enabled. Normal operation for a respective disabled passive entry function will resume when enabled.

Figure 3:
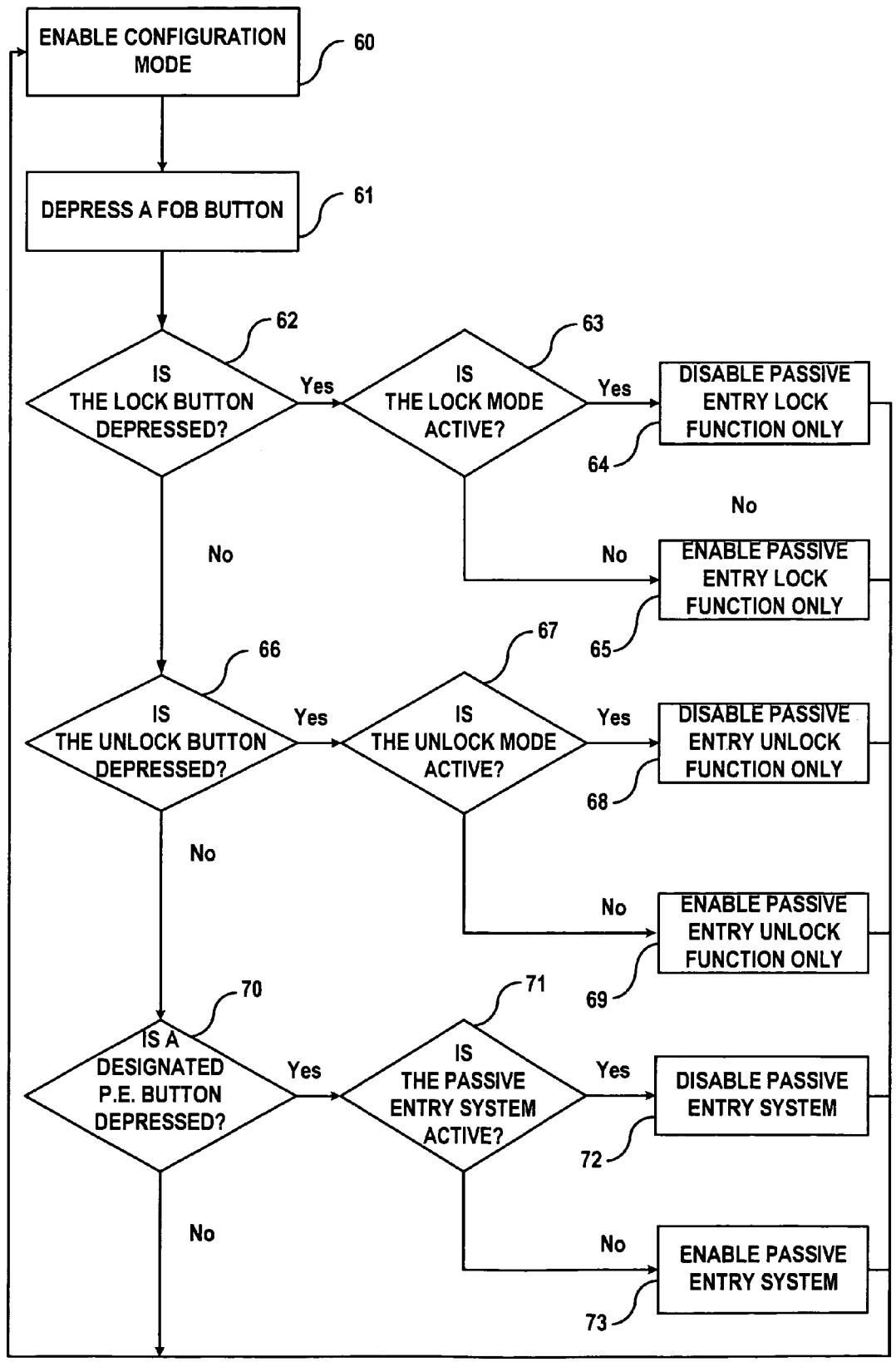
FIG. 3 is a flowchart for switching a passive entry operation mode to a first preferred embodiment of the present invention.

FIG. 3 illustrates a method of configuring an operation mode of a passive entry system. The following method may be used with polling or non-polling options for passive entry system. In step 60, the configuration mode is activated by actuating the predetermined combination of buttons on the portable communication device. The portable communication device broadcasts a configuration mode command signal to the vehicle based communication module located within the vehicle. In step 61, a respective button on the portable communication device is depressed. The respective button is associated with a passive entry operation mode. The corresponding command signal is broadcast to the vehicle based communication device in response thereto. In step 62, a determination is made as to whether the lock button on the portable communication device was depressed based on received corresponding command signal. If the determination is made that the lock button is depressed, then a determination is made in step 63 as to whether the passive entry auto-lock feature is currently enabled. If the determination is that the passive entry auto-lock feature is currently enabled, then the passive entry auto-lock feature is disabled in step 64. If the determination is made in step 63 the passive entry auto-lock feature is currently disabled, then the passive entry auto-lock feature is enabled in step 65.

If the determination was made that the lock button is not depressed step 62, a determination is made as to whether the unlock button on the portable communication device was depressed in step 66 based on the received corresponding command signal. If the determination is made that the unlock button is depressed, then a determination is made in step 67 as to whether the passive entry unlock feature is currently enabled. If the determination is that the passive entry lock feature is currently enabled, then the passive entry unlock feature is disabled in step 68. If the determination is made in step 67 that the passive entry unlock feature is currently disabled, then the passive entry unlock feature is enabled in step 69.

If the determination is made in step 66, that the unlock button is not depressed, then a determination is made as to whether the dedicated passive entry button or combination of buttons on the portable communication device was depressed in step 70 based on the received corresponding command signal. If the determination is made that the dedicated passive entry button is depressed, then a determination is made in step 71 as to whether the passive entry system is currently enabled. If the passive entry system is currently enabled, then the passive entry system is disabled in step 72. If the determination is made in step 71 that the passive entry system is currently disabled, then the passive entry system is enabled in step 73.

The display 39 of the portable communication device 32 (shown in FIG. 1) may be used to display passive entry status information in addition to general vehicle status information. Such passive entry status information may include the various passive entry status modes such as, but not limited to, "configuration mode enabled", "auto-unlock disabled", "passive entry system disabled", etc.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for configuring an operation mode of a passive entry system of a vehicle, said method comprising the steps of:

enabling a configuration mode of a vehicle based communication module by depressing a predetermined combination of actuation buttons on a portable communication device to broadcast a configuration mode command signal;

selecting a passive entry configuration by depressing a respective actuation button on said portable communication device when in said configuration mode, said portable communication device broadcasting a corresponding command signal to said vehicle based communication module identifying said selection; and receiving said corresponding command signal from said portable communication device and adopting said selected passive entry configuration in response thereto;

wherein each configurable passive entry function has a corresponding actuation button on said portable communication device, and wherein a respective configurable passive entry function is selected by depressing a respective actuation button when in said configuration mode that corresponds to the respective configurable passive entry function.

2. The method of claim 1 wherein said passive entry configuration comprises activation of polling for an automatic door unlocking function and deactivation of polling for an automatic door unlocking function.

3. The method of claim 1 wherein said passive entry configuration comprises activation of polling for an automatic door locking function.

4. The method of claim 1 wherein said passive entry configuration comprises deactivation of polling for an automatic door locking function.

5. The method of claim 1 wherein said passive entry configuration comprises activation of a passive door unlocking function without polling.

6. The method of claim 1 wherein said passive entry configuration comprises deactivation of a passive door unlocking function without polling.

7. The method of claim 1 wherein said passive entry configuration comprises activation of polling for a passive trunk unlocking function.

8. The method of claim 1 wherein said passive entry configuration comprises deactivation of polling for a passive trunk unlocking function.

9. The method of claim 1 wherein said passive entry configuration comprises activation of polling for all passive entry vehicle functions.

10. The method of claim 1 wherein said passive entry configuration comprises deactivation of polling for all passive entry vehicle functions.

11. The method of claim 1 wherein said passive entry configuration comprises activation of all passive entry vehicle functions without polling.

12. The method of claim 1 wherein said passive entry configuration comprises deactivation of all passive entry vehicle functions without polling.

13. A configurable passive entry system comprising:

a portable communication device having passive entry functionality and remote keyless entry functionality, said portable communication device having a plurality of actuation buttons for broadcasting remote entry signals therefrom; and a vehicle based communication module for receiving broadcast signals from said portable communication module and for controlling a passive entry configuration of a passive entry vehicle function;

wherein said a predetermined combination of buttons on said portable communication device are depressed for broadcasting a configuration mode command signal to said vehicle based communication device for enabling a configuration mode of said vehicle based communication module; and wherein each configurable passive entry function has a corresponding actuation button on said portable communication device, and wherein a respective configurable passive entry function is selected by depressing a respective actuation button when in said configuration mode that corresponds to the respective configurable passive entry function for changing a configuration of the selected configurable passive entry function.

14. The apparatus of claim 13 wherein said vehicle based communication module includes a controller that configures said passive entry operation for activating and deactivating polling for an automatic door unlock function.

15. The apparatus of claim 14 wherein said controller configures said passive entry operation for activating and deactivating polling for an automatic door lock function.

16. The apparatus of claim 14 wherein said controller configures said passive entry operation for activating and deactivating polling for all vehicle passive entry functions.

17. The apparatus of claim 14 wherein said controller configures said passive entry operation for activating and deactivating an automatic door unlock function without polling.

18. The apparatus of claim 14 wherein said controller configures said passive entry operation for activating and deactivating a trunk unlatch operation without polling.

19. The apparatus of claim 14 wherein said controller configures said passive entry operation for activating and deactivating all vehicle passive entry functions without polling.

* * * * *

UNITED STATES PATENT AND TRADEMARK OFFICE
CERTIFICATE OF CORRECTION

PATENT NO. : 7,629,873 B2  Page 1 of 1
APPLICATION NO. : 11/127398
DATED : December 8, 2009
INVENTOR(S) : Ghabra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1245 days.

Signed and Sealed this

Second Day of November, 2010

David J. Kappos
*Director of the United States Patent and Trademark Office*